(12) United States Patent
Chen

(10) Patent No.: US 6,848,699 B2
(45) Date of Patent: Feb. 1, 2005

(54) LEG DIRECTION-CONTROL MINI-TRICYCLE

(76) Inventor: Ji-Huang Chen, P.O. Box 641, Chung-Li 320 (TW)

( * ) Notice: Subject to any disclaimer, the term of this patent is extended or adjusted under 35 U.S.C. 154(b) by 0 days.

(21) Appl. No.: 10/151,552

(22) Filed: May 17, 2002

(65) Prior Publication Data
US 2002/0180177 A1 Dec. 5, 2002

(30) Foreign Application Priority Data
May 30, 2001 (TW) ....................................... 90208857 U

(51) Int. Cl.⁷ ............................................... B62K 3/02
(52) U.S. Cl. ......................... 280/278; 280/287; 180/205
(58) Field of Search ................................. 280/200, 259, 280/278, 281.1, 282, 287; 180/65.1, 65.2, 220, 205–207

(56) References Cited
U.S. PATENT DOCUMENTS 4,887,829 A * 12/1989 Prince ......................... 280/282
5,398,955 A * 3/1995 Yeh ............................. 280/287
5,941,548 A * 8/1999 Owsen ........................ 280/282
6,104,154 A * 8/2000 Harada et al. .............. 318/362
6,354,618 B1 * 3/2002 Liao ............................ 280/287
6,464,031 B1 * 10/2002 Cobb .......................... 180/230

* cited by examiner

Primary Examiner—Lesley D. Morris
Assistant Examiner—L. Lum

(57) ABSTRACT

A mini-tricycle capable of being controlled by legs for determining the direction of the mini-tricycle comprises a front frame and a rear frame. The front frame has a front wheel fork and a pedal fork. The front wheel fork has front wheel spindle. The front wheel spindle is pivotally connected to a front wheel and a follower. The follower is fixedly connected to a front wheel. The front wheel fork is connected to a lower end of the pedal fork. An upper end of the pedal fork is connected with a pedal seat. A pedal shaft is pivotally installed to the pedal seat. The pedal shaft is fixed with a driving means. The driven means serves to connect the driving means and the follower. Thereby, the volume and weight of the tricycle are reduced so that it can be carried easily. Moreover, the tricycle is suitable for children and adults.

13 Claims, 17 Drawing Sheets

# LEG DIRECTION-CONTROL MINI-TRICYCLE

FIELD OF THE INVENTION

The present invention relates to tricycles, and particularly to a mini-tricycle capable of being controlled by legs for determining the direction of the mini-tricycle which can be controlled by legs or hands so that children and adults can drive it conveniently.

BACKGROUND OF THE INVENTION

Referring to FIG. 1, a prior art bicycle is illustrated. The bicycle has a frame, a front wheel and a rear wheel. The diameters of the front wheel and rear wheel are about 1 meter. The wheels are driven by pedals attached to the frame. The direction of the bicycle is controlled by the front wheel. The prior art bicycle is heavy and large and thus to be suitable for the sizes of children and adults, various styles are designed. As a result, a children must change a new one with the increasing of age. Moreover, the bicycle easily falls down.

Referring to FIG. 2, a prior art tricycle is shown. In this kind of tricycle, the rear wheel in bicycle is changed to two small wheels. The front wheel is driven and is as a direction controller.

Some foldable bicycles have been developed, but they are inconvenient as it is folded (the operation must have some mechanical knowledge). Moreover, it is difficult in transfer.

SUMMARY OF THE INVENTION

Accordingly, the primary object of the present invention is to provide a mini-tricycle capable of being controlled by legs for determining the direction of the mini-tricycle, wherein the volume of the tricycle is reduced to one fifth and the weight thereof is reduced to one half so that it can be carried easily and conveniently. Moreover, the tricycle is suitable for children and adults. Since the tricycle has three wheels, and thereby, it is steady and easily controlled. Moreover, the direction can be controlled by legs or hands. The tricycle is foldable for storage. The tricycle is low and thus the legs of the driver can touch the ground easily and the tricycle is safe.

To achieve above objects, the present invention provides a mini-tricycle capable of being controlled by legs for determining the direction of the mini-tricycle, wherein the mini-tricycle comprising a front frame and a rear frame. The front frame has a front wheel fork and a pedal fork. A lower end of the front wheel fork has a front wheel spindle. The front wheel spindle is pivotally connected to a front wheel and a follower. The follower is fixedly connected to a front wheel. A lower end of the front wheel fork is connected to a lower end of the pedal fork. An upper end of the pedal fork is connected with a pedal seat. A pedal shaft is pivotally installed to the pedal seat. The pedal shaft is fixed with a driving means. A driven means serves to connect the driving means and the follower. Each of two ends of the pedal shaft is connected to one end of a crank. Another end of each crank is pivotally connected to a pedal; and a stand shaft is connected to an upper end of the front wheel fork. The rear frame has a sleeve which is pivotally connected to the stand shaft. An L shape seat frame is connected with the sleeve. A top of the seat frame has a cushion; and a lower end of the seat frame is connected with a pair of rear wheels Moreover, the handles of the present invention are foldable so as to reduce the storage volume.

The various objects and advantages of the present invention will be more readily understood from the following detailed description when read in conjunction with the appended drawing.

DETAILED DESCRIPTION OF THE PREFERRED EMBODIMENTS

Figure 1:
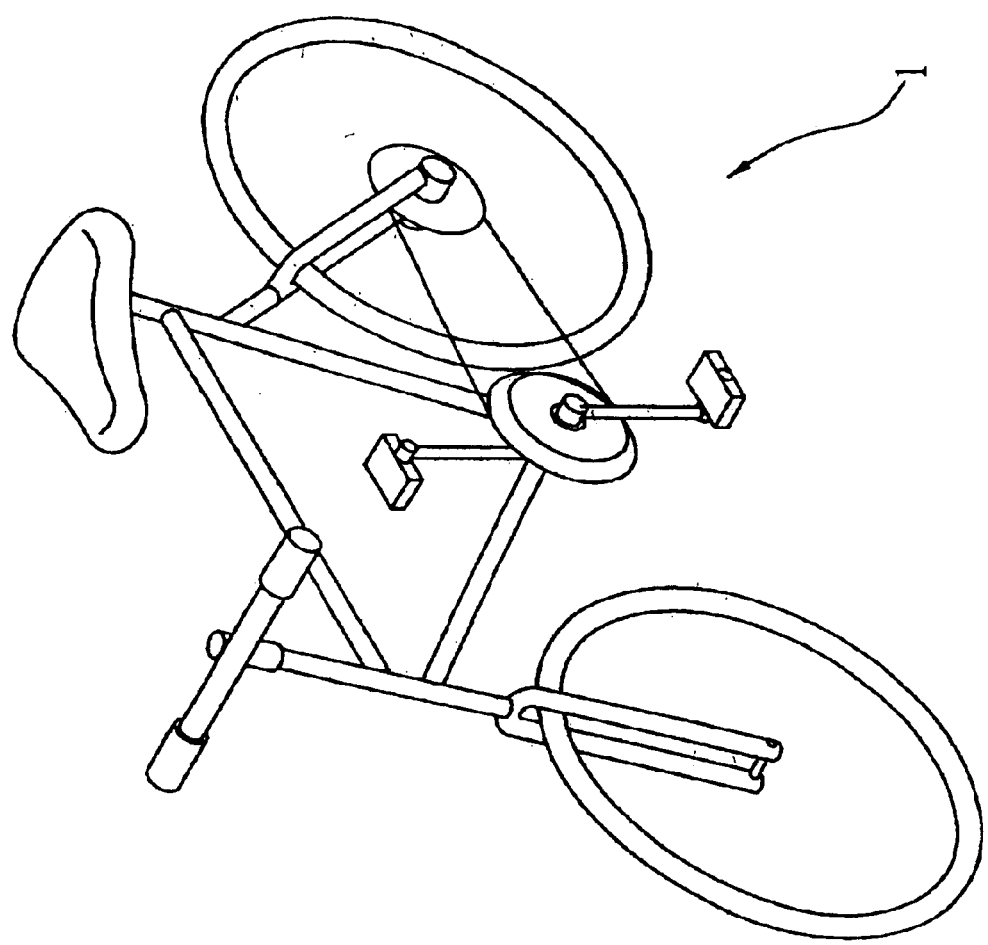
FIG. 1 is a perspective view of a prior art.
Figure 2:
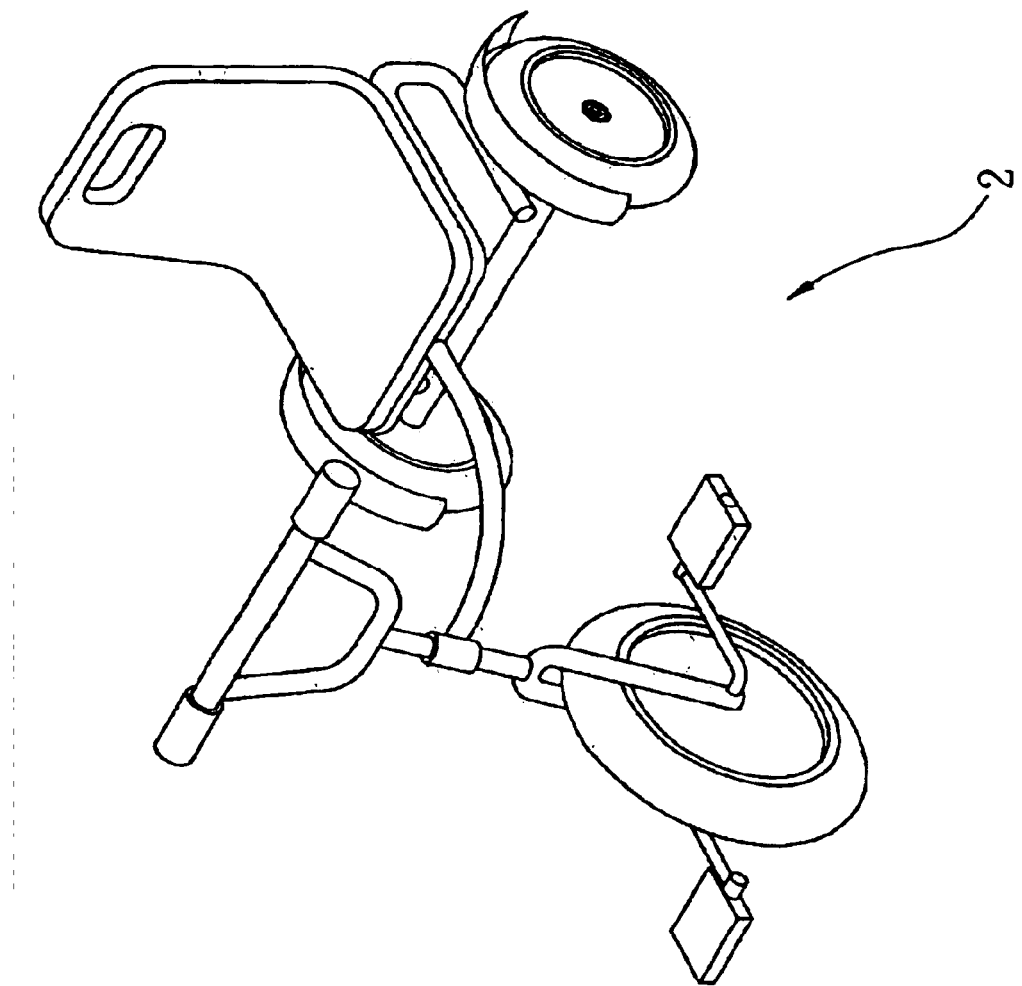
FIG. 2 is a perspective view of a prior art tricycle.
Figure 3:
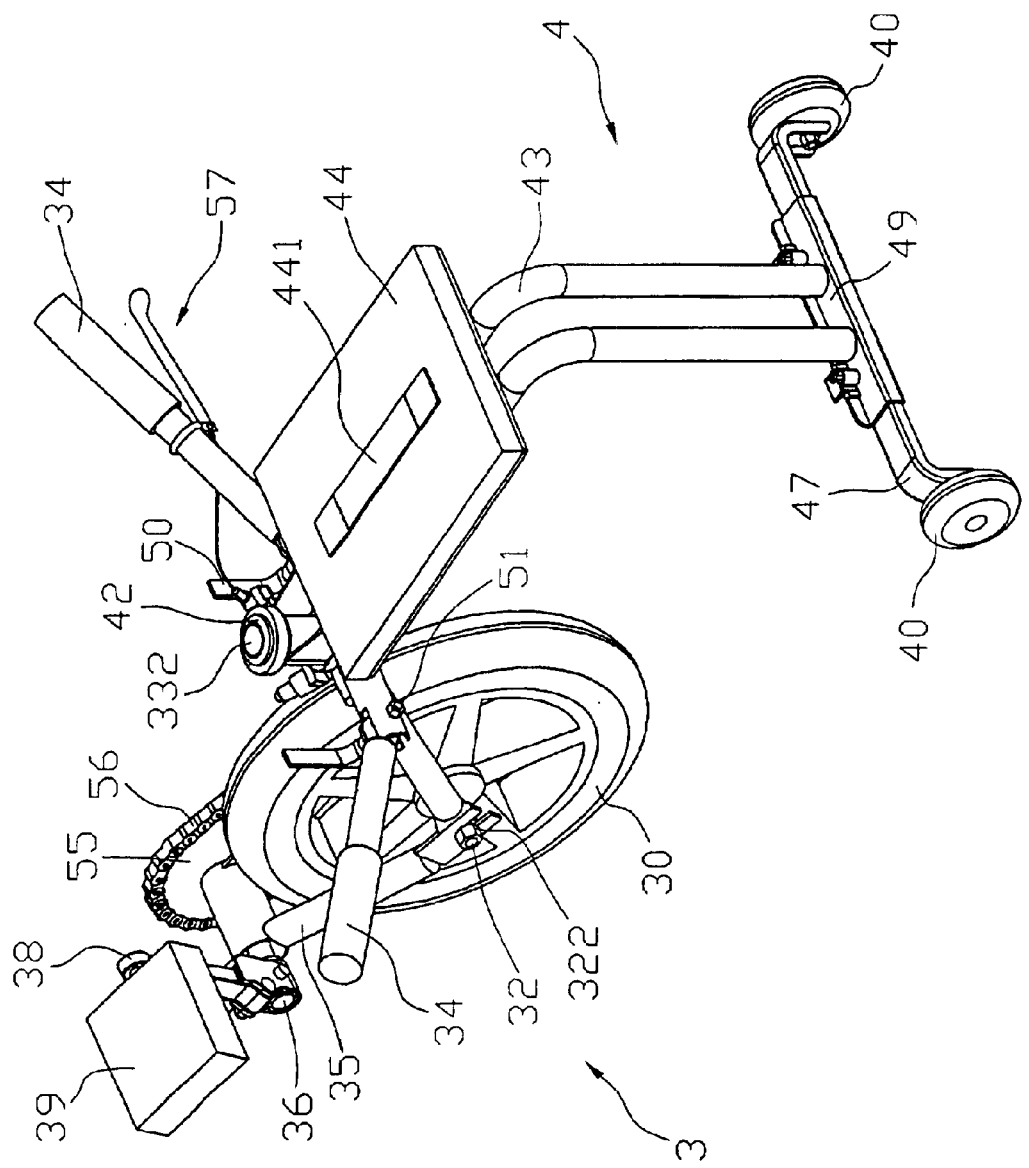
FIG. 3 is a perspective view of the present invention.
Figure 4:
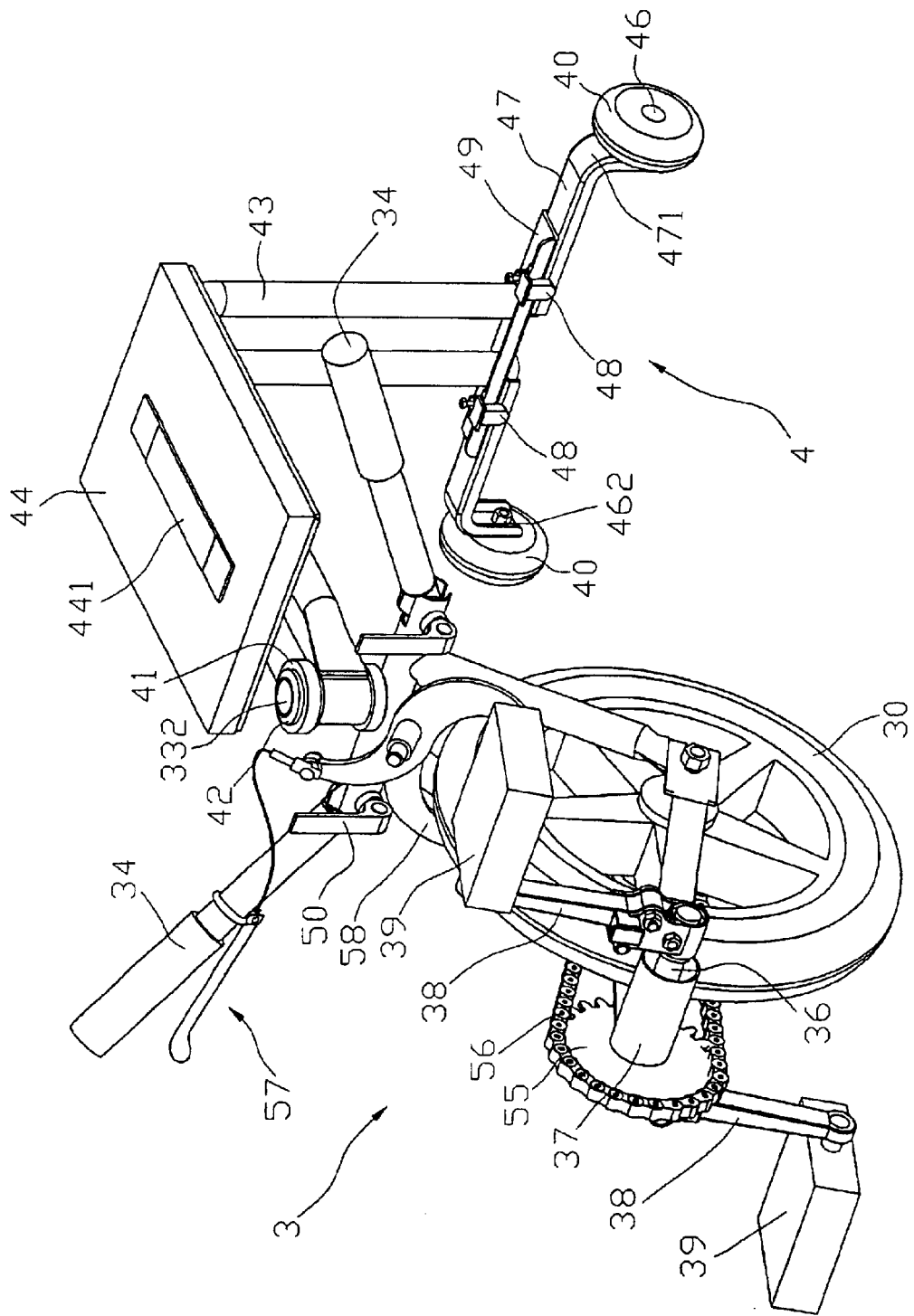
FIG. 4 is a perspective view of the present invention viewing from another visual angle.
Figure 5:
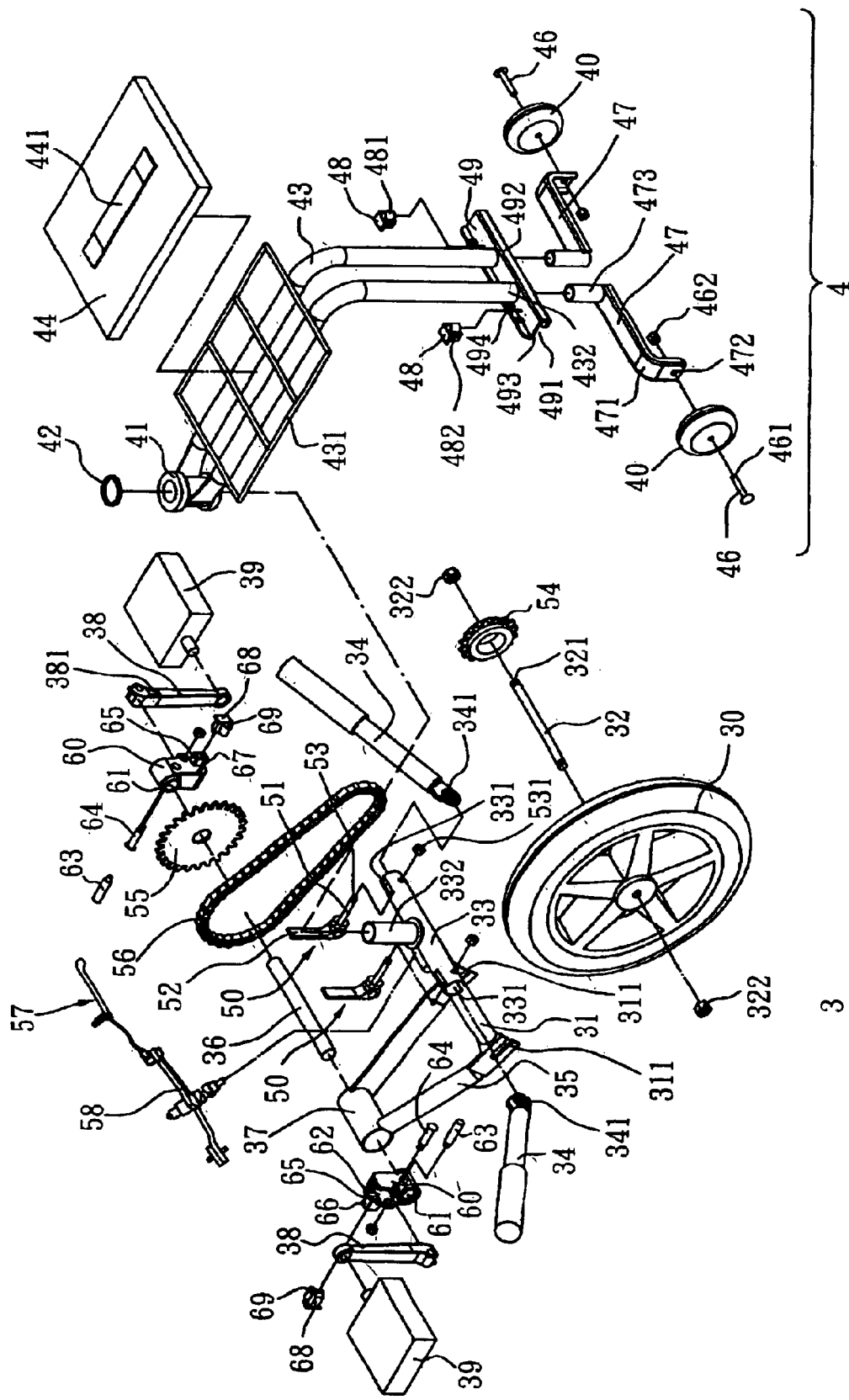
FIG. 5 is an exploded perspective view of the present invention.

Referring to FIGS. 3 to 5, the mini-tricycle capable of being controlled by legs for determining the direction of the mini-tricycle according to the present invention is illustrated. The mini-tricycle has a front frame 3 and a rear frame 4 which are pivotally connected to one another. The front frame 3 has a front wheel fork 31, a handle seat 33, a pedal fork 35, and a pedal seat 37. A lower end of the front wheel fork 31 has a groove 311 for being inserted by a front wheel spindle 32. The front wheel spindle 32 is pivotally connected to a front wheel 30 and a follower. The follower is a chain wheel 54. One lateral side of the driven chain wheel 54 is connected to one lateral side of the front wheel 30 so that the chain wheel 54 can drive the front wheel 30 to rotate. Two ends of the front wheel spindle 32 have respective threaded portions 321. Each threaded portion 321 is locked to the outer side of the groove 311 of the front wheel fork 31. A lower end of the front wheel fork 31 is connected to a lower end of the pedal fork 35 so as to be formed as a V shape.

An upper end of the front wheel fork 31 is connected to the handle seat 33. Two sides of the handle seat 33 are connected to respective handles 34. Each handle 34 is integrally formed with the handle seat 33, as shown in the FIG. 6.

Besides, the handle 34 is foldable, as shown in FIG. 5. Two sides of the handle seat 33 are connected to respective handles 34. The handle 34 is connected to the handle seat 33 through a quick detaching means 50. Two ends of the handle seat 33 have respective grooves 311. One end of each handle 34 is an embedding piece 341. The embedding piece 341 is inserted into the groove 311. One spindle 51 of the quick detaching means 50 passes through the penetrating hole of the handle seat 33 and the penetrating hole of the embedding piece 341 of the handle 34. The quick detaching means 50 is connected to the spindle 51 through a control arm 52 thereof. Another end of the spindle 51 is a threaded end 53. A nut 531 serves to lock the threaded end 53. The spindle 51 has an enlarged end and a handle seat 33 has a stand shaft 332. The handle seat 33 can be connected to the lower end of the stand shaft 332 so that the stand shaft 331 is connected to an upper end of the front wheel fork 31.

Figure 7:
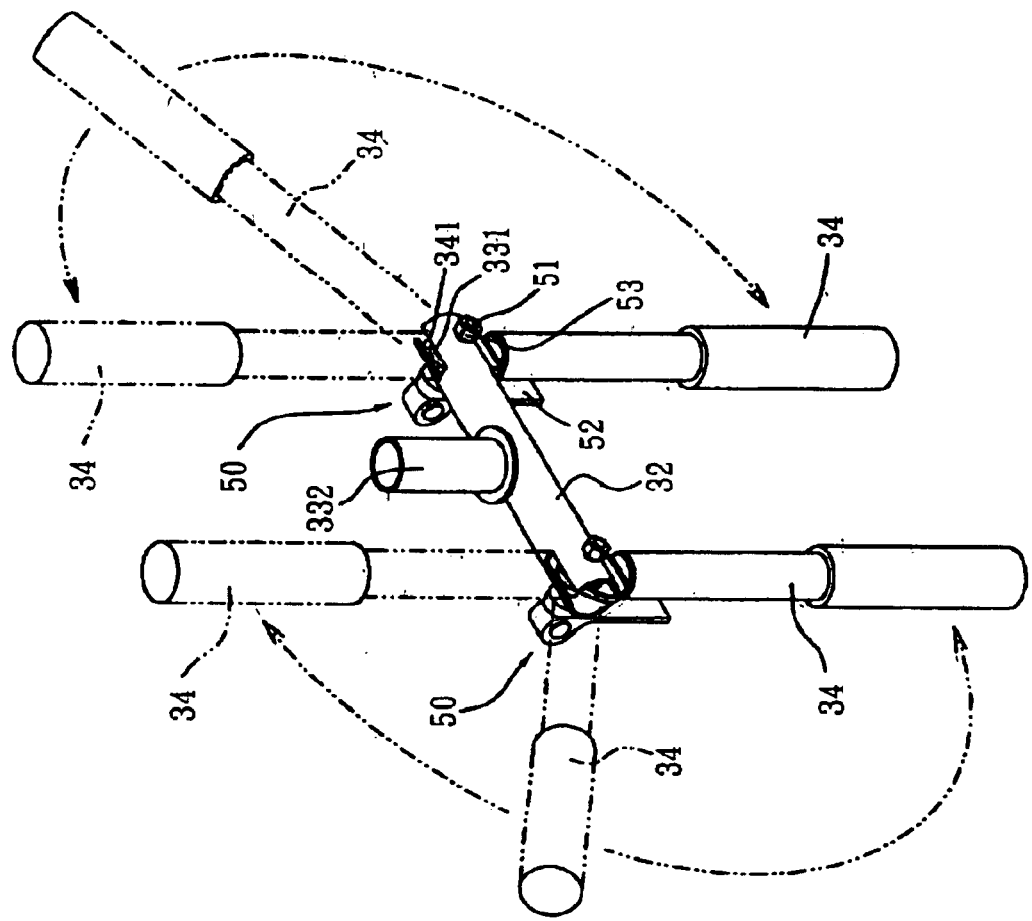
FIG. 7 is a perspective view showing that the handles of the present invention are folded.
Figure 13:
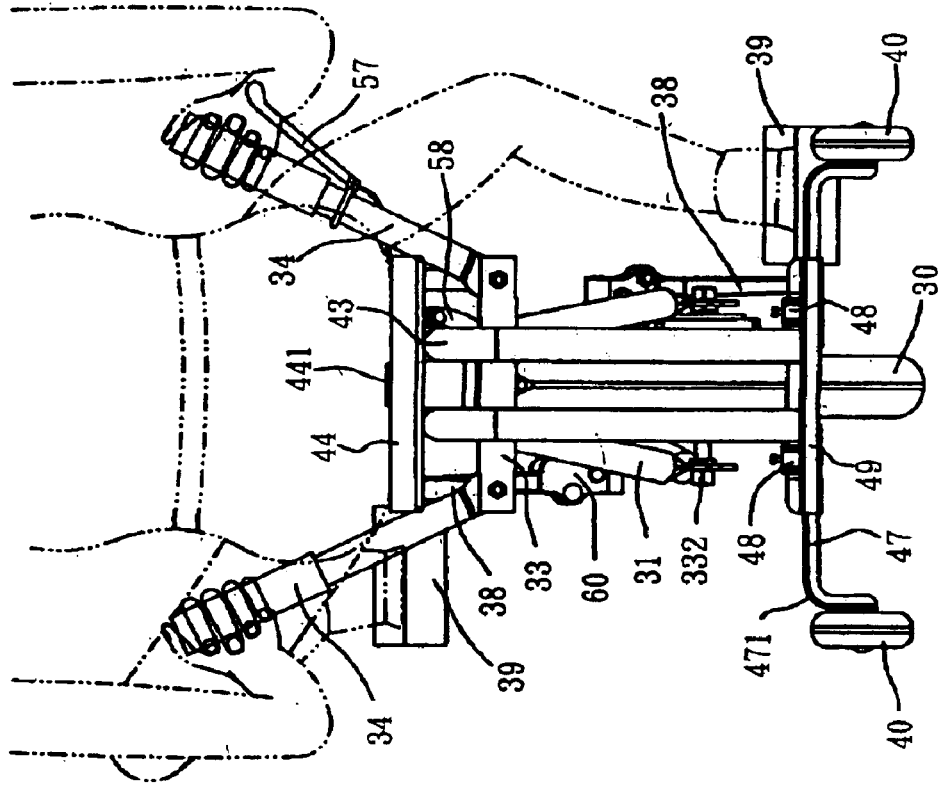
FIG. 13 is a rear view showing the first application of the present invention.
Figure 14:
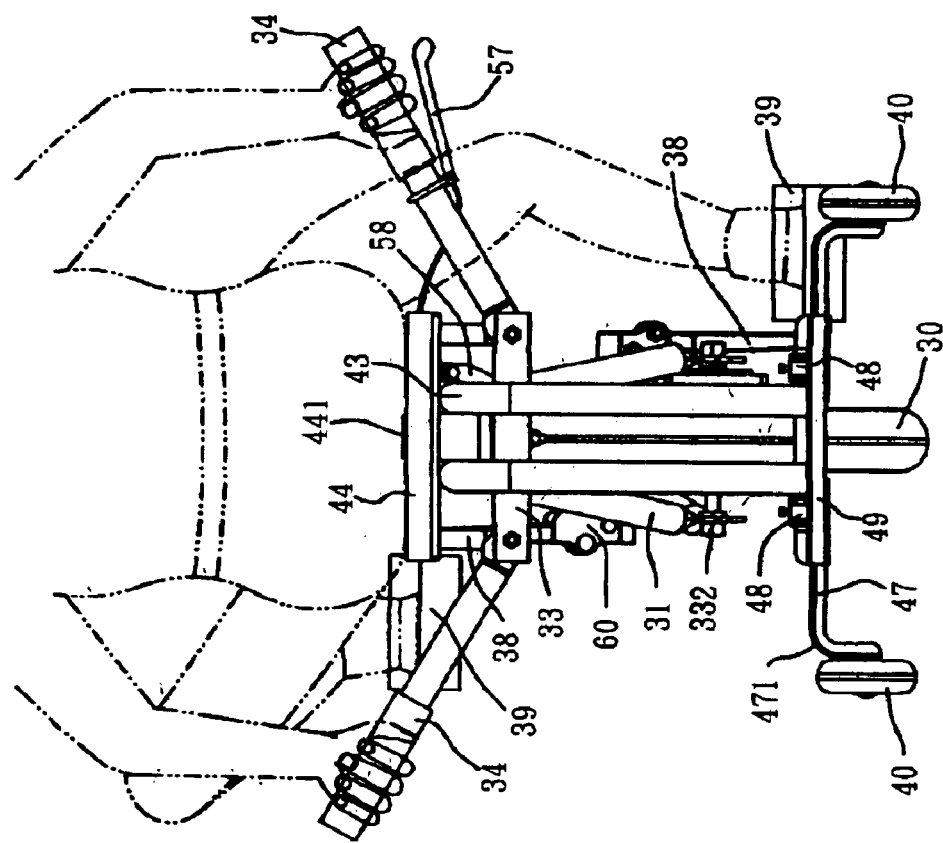
FIG. 14 is a rear view of the second application of the present invention.

After the handles 34 are folded for storage, as illustrated in FIG. 7. It moves along the trace shown in the dashed line. The adjustment of the position can be performed by the quick detaching means 50. The handle 34 can be adjusted between a vertical upward position to a vertical downward position so as to suit the necessity of the user. Referring to FIGS. 13 and 14, in FIG. 13, it is illustrated that the handle 34 are positioned at a front end of the two sides of the driver, and FIG. 14 shows that the handles 34 are inclined at the lower end of the two sides of the driver.

With reference to FIG. 5, one handle 34 is connected with a brake 57 at the front wheel 30. The brake clip 58 is fixed to the front wheel 30.

In FIG. 5, the pedal seat 37 on an upper end of the pedal fork 35 is pivotal connected to a pedal shaft 36. A driving chain wheel 55 is fixed to the pedal shaft 36. A driving means serves to connect the driving chain wheel 55 with the driven chain wheel 54. The driving means is a driving chain 56. Each of two ends of the pedal shaft 36 is connected to one end of a crank 38. Another end of the crank 38 is connected to a pedal 39.

Figure 6:
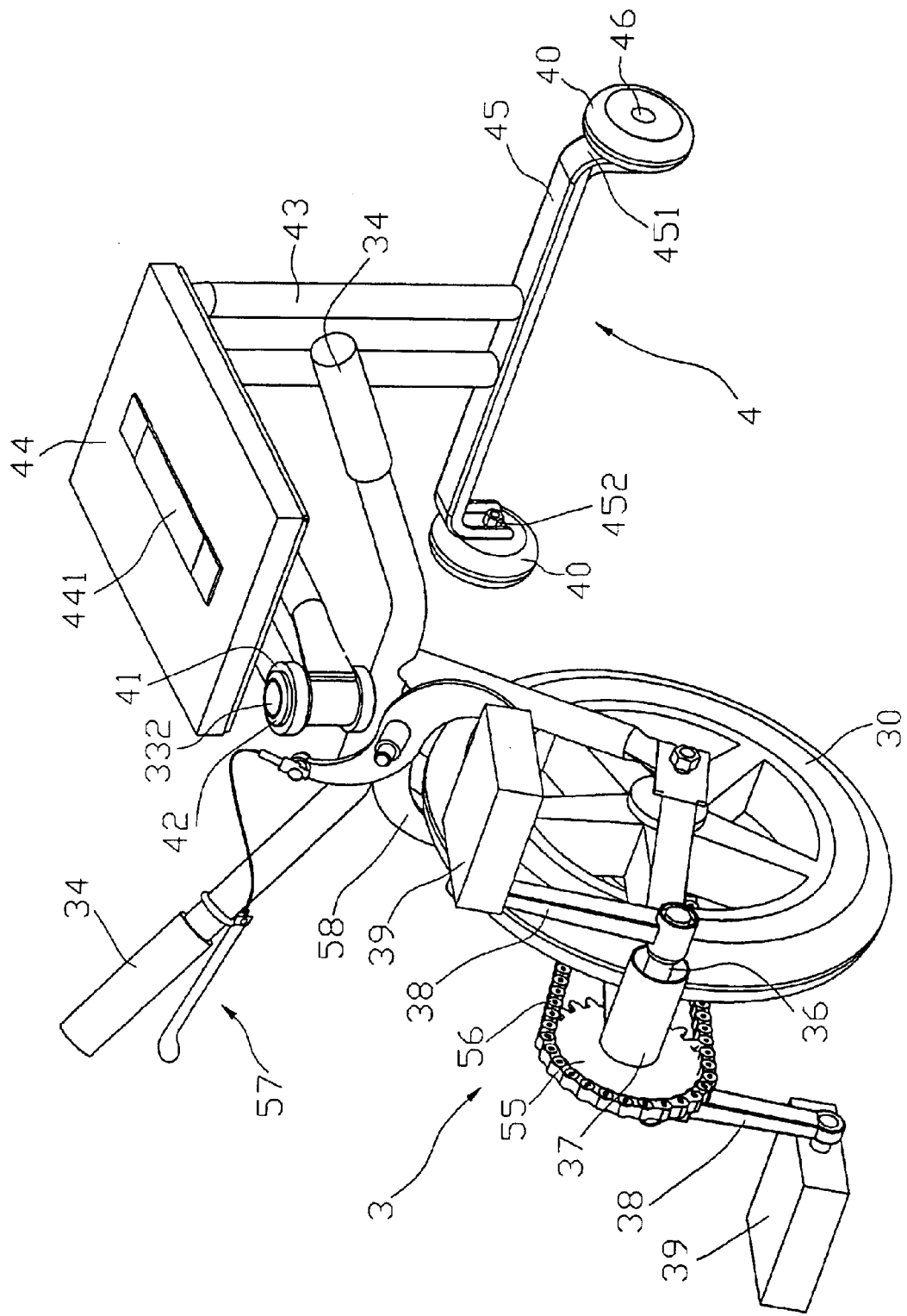
FIG. 6 is a perspective view showing an unfoldable type of the present invention.

Referring to FIG. 6, the crank 38 is directly connected to the pedal shaft 36. It is an unfoldable connection.

The crank 38 in FIG. 5 is foldable. A crank positioning seat 60 is connected between the crank 38 and the pedal shaft 36. The crank positioning seat 60 has an axial hole 61 and a positioning slot 62. A pedal shaft 36 inserts into the axial hole 61 and then a fixing shaft 63 is used to fix the two. After the crank 38 inserts into the positioning slot 62, a rotary shaft 64 penetrates therethough and then fixes the two. An opening 381 is formed on the crank 38. The crank positioning seat 60 has a penetrating hole 65 out of the position slot 62. A frame body 66 protrudes from the penetrating hole 65. A crank tenon 68 passes through the frame body 66, the penetrating hole 65 and the opening 381 to position the crank 38 so that the crank 38 can not rotate and move as illustrated in FIGS. 3 and 4.

Figure 8:
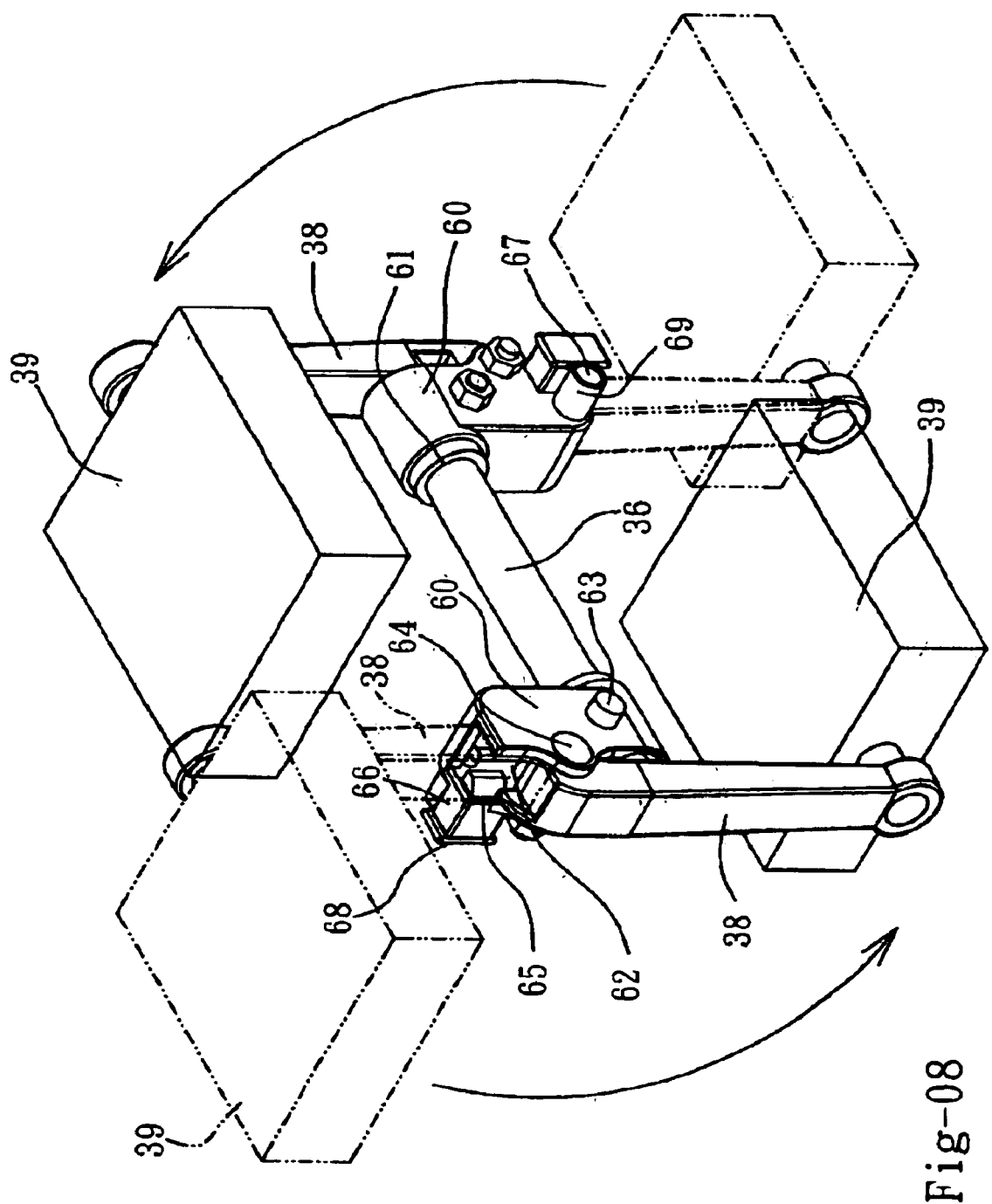
FIG. 8 is a perspective view showing that the crank of the present invention is folded.

As shown in FIG. 8, when the crank tenon 68 is pulled out so that the crank 38 is not fixed, and then the crank 38 rotates through 180 degrees and moves from a position shown in the dashed line to a position shown in the solid line. A guide rod 67 is installed on the crank positioning seat 60 and an engaging hole 69 is formed in the crank tenon 68. The guide rod 67 inserts into the engaging hole 69 so as to move with the guide rod 67. A retaining means at an outer end of the guide rod 67 serves to prevent the crank tenon 68 from separation.

Referring to FIG. 5, the rear frame 4 is pivotally connected to the stand shaft 332 of the handle seat 33 by a sleeve 41. A retaining nut 42 serves to fix the rear frame 4 at an upper end of the sleeve 41. The sleeve 41 is connected to a seat frame 43 having an L shape. A top surface of the seat frame 43 is connected to a cushion 44 by a top frame 432. The cushion 44 has a lifting handle 441. A lower end of the seat frame 43 is connected to a pair of rear wheels 40.

With reference to FIG. 6, a lower end of the seat frame 43 is connected to an arm 45. The rear wheel 40 is pivotally connected to a through hole 452 at the lower folding end 451 of the arm 45. Above mentioned illustrates the rear wheel of the present invention.

The rear wheel can be folded for storage, as shown in FIG. 5. Each of the rear wheels 40 is connected to one end of a swing arm 47. The swing arm 47 has a lower folding end 471 which has a through hole 472. A shaft 46 passes through the through hole 472 and the through hole of the rear wheel 40, and then a nut 462 is locked to the threaded portion 461 at the axial center 46 of the rear wheel 40. Another end of the swing arm 47 is connected to a protruding tube 473. The protruding tube 473 is pivotally connected to the tube portion 432 at the lower end of the seat frame 43.

A lower end of the seat frame 43 is an arm portion 49. Two ends of the arm portion 49 have respective protruding openings 491 of the swing arm. A rear side of the arm portion 49 is folded downwards and then folded inwards as a sealing side 492. A front side of the arm portion 49 is an open end 493. A pair of arm tenons 48 are formed on the arm portion 49. Each arm tenon 48 has an engaging hole 481. The arm, portion 49 has a pair of guiding rods 494. The engaging holes 481 of the arm tenon 48 is inserted by the guiding rods 494 so that the suspending end 482 of the swing arm 48 resists against the opening 493 of the swing arm 47. The assembled view is illustrated in FIGS. 3 and 4.

Figure 9:
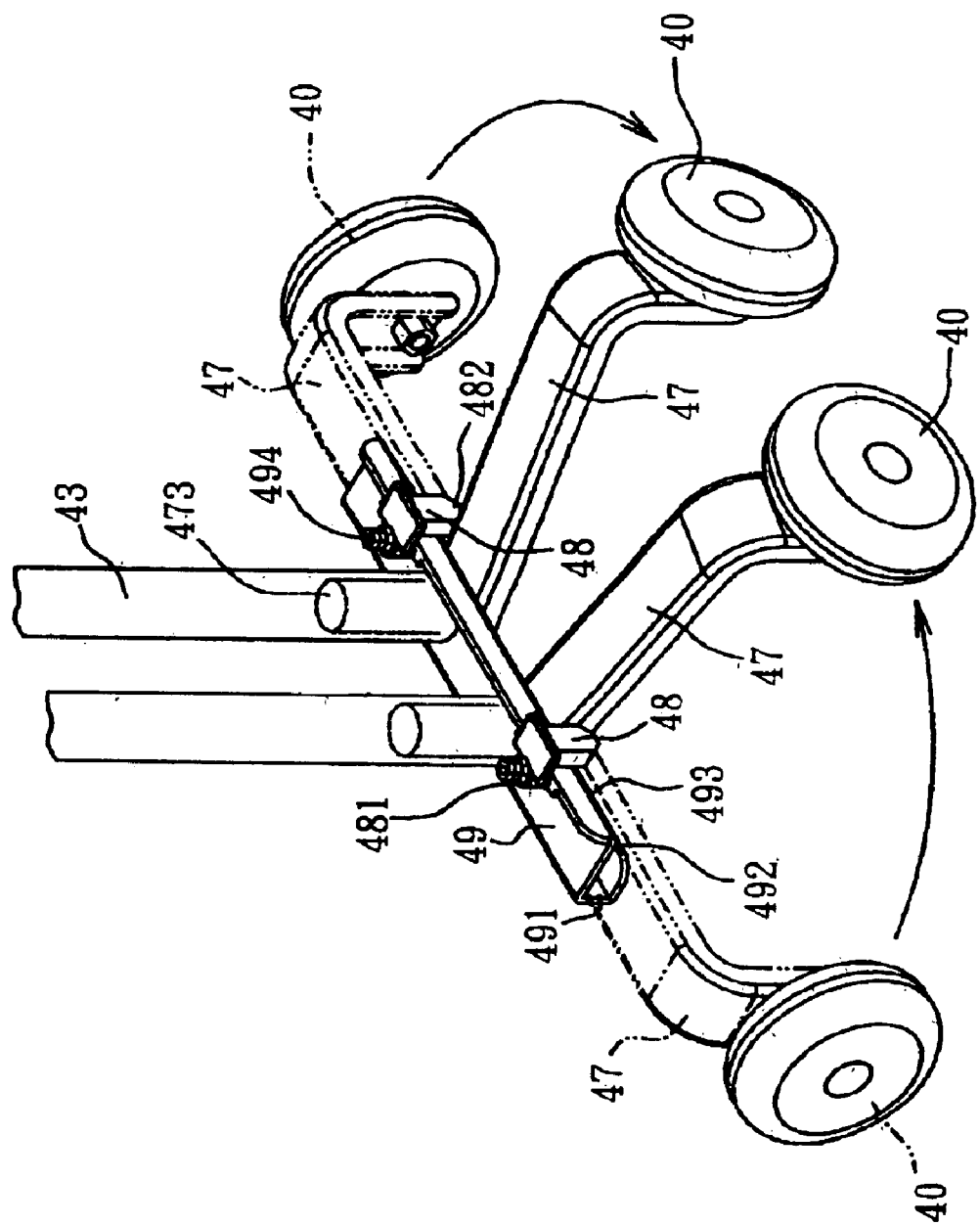
FIG. 9 is a perspective view showing that the rear wheel of the present invention is folded.

With reference to FIG. 9, the arm tenons 48 move upwards along the guiding rods 494 and thus the swing arms 47 may rotate forwards so as to move from a position illustrated by dashed line to a position illustrated by solid line. Then it is positioned to the outer side of the swing arm 47 by the tenon 48 so that the swing arm 47 can not rotate outwards.

Figure 10:
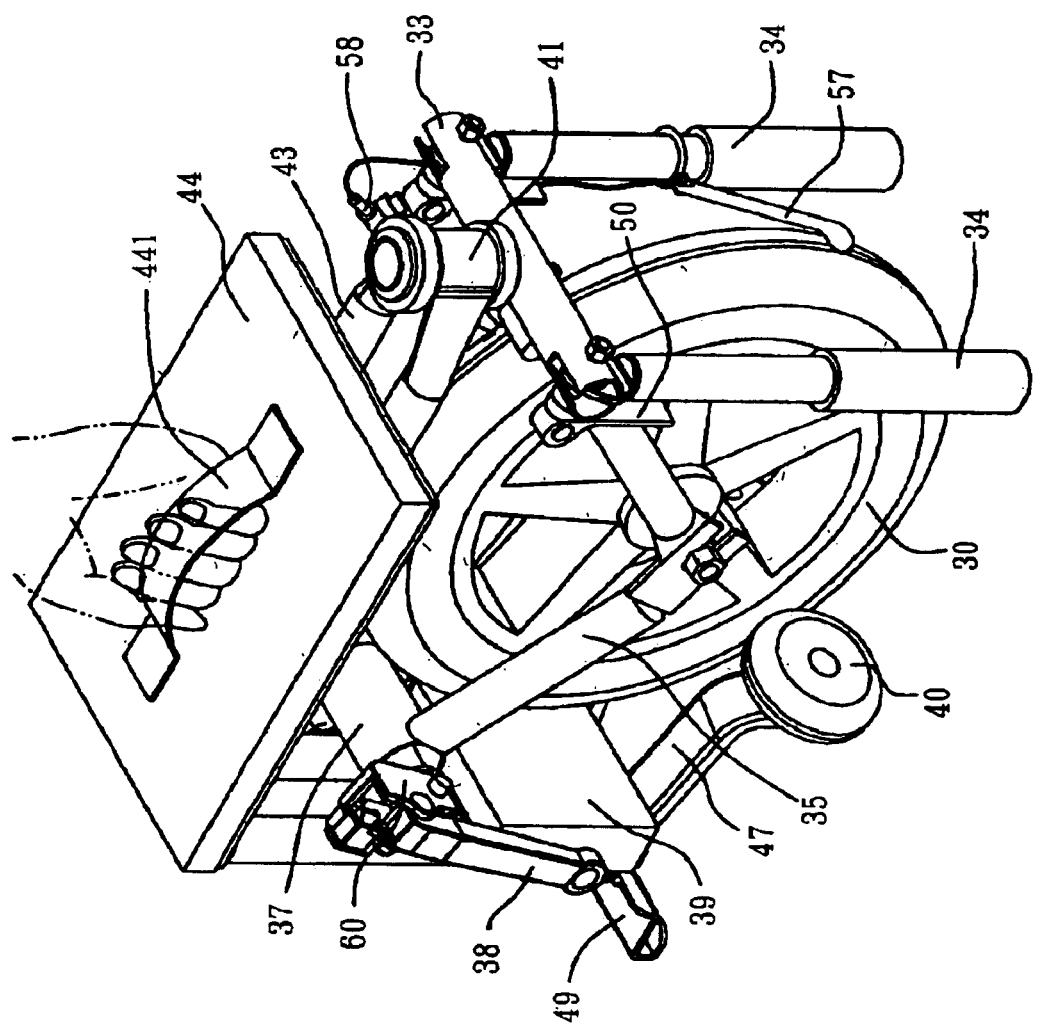
FIG. 10 is a perspective view showing that the present invention is closed.

The folding operation of the present invention is illustrated by FIGS. 7 to 9. The folding operation causes the tricycle to be at a folding statue as illustrated in FIG. 10. In the operation, the handle 34 is closed firstly. Then the crank 38 is closed. Then the rear frame 4 rotates forwards through 180 degrees to be across the upper side of the front frame 3. Thereby, the two frames 3 and 4 are overlapped. Then the closing operation of the swing arms 47 at the rear wheels 40 are performed so that the rear wheels 40 are positioned at two sides of the front wheel 30. Thereby, the rear frame 4 cannot rotate and expand, causing the occupying space is reduced to one half. Therefore, the present invention may be stored by folding the crank 38, the handles 34 or the rear wheels 40. The closing tricycle is as a block body. Then it can be carried away by carrying the lifting handle 441.

Figure 11:
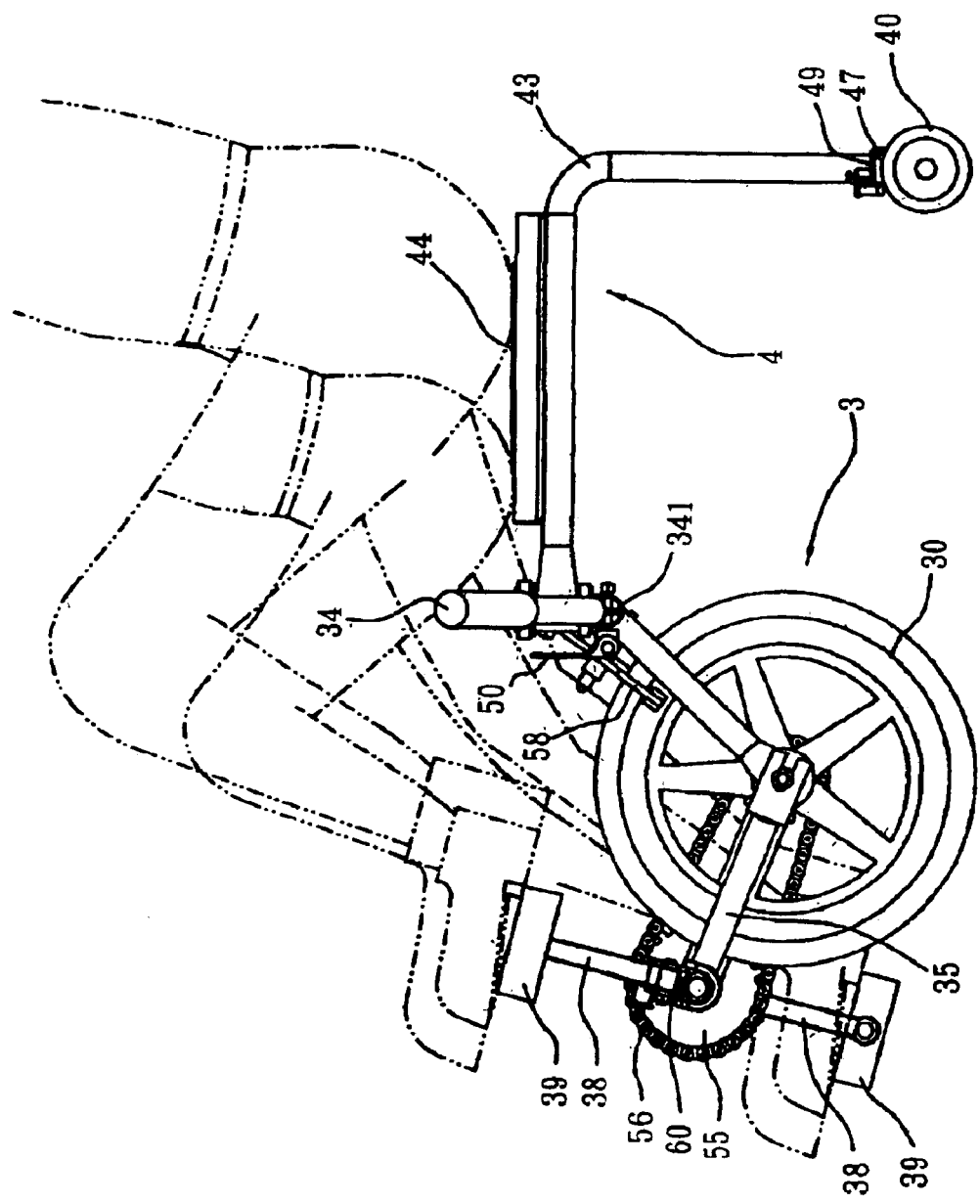
FIG. 11 is a lateral view of the present invention which is suitable for adults and children.
Figure 12:
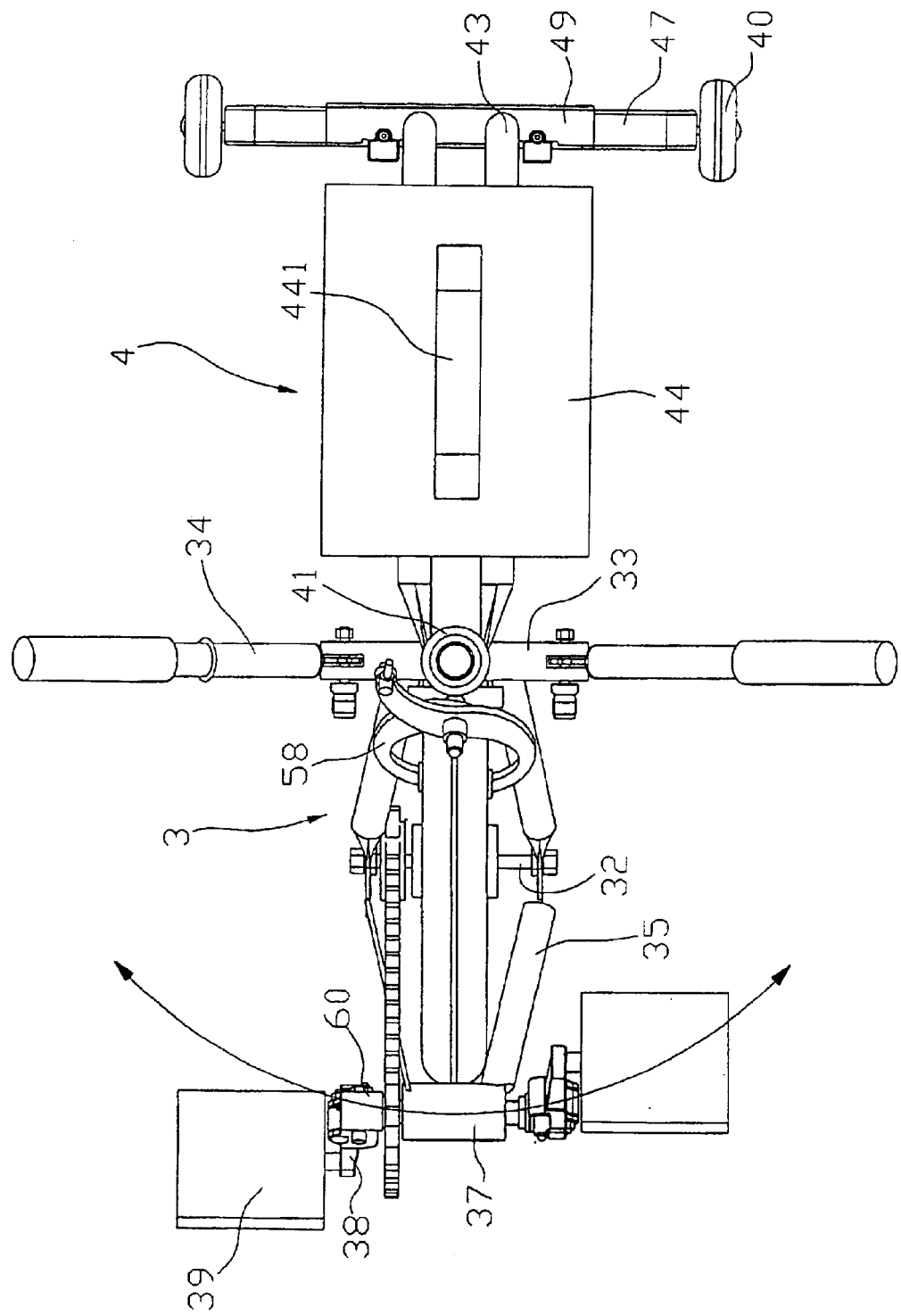
FIG. 12 is an upper view of the present invention showing the forwards movement of the present invention being executed by legs.

In above structure, the front frame 3 and rear frame 4 are pivotally connected and the driving pedals are placed at a front side, as shown in FIG. 11. When a child sits on the front end of the cushion, the children legs are exactly in contact with the pedals and then the hands can hold the handles to control the direction of the tricycle. When an adult sits at a rear end of the cushion, the legs of the adult can expand freely and can control the moving direction, as shown in FIG. 12. When two legs are placed upon the pedals, and the tension of the right leg is larger than that of the left leg, the front frame can rotate leftwards with respect to the rear frame, and vice versa by a force of arm from the pedal seat 37 to the sleeve 41. This is the way of the present invention that the moving direction can be controlled by legs. That is to say the axial center of the whole tricycle is not at the exact lower side of the body (such as bicycle) and is not at the extending line from the axial center of the sleeve (such a child's tricycle), but in the present invention, the axial center is at the rotate shaft of the front pedal in the extending line of the sleeve. Thereby, the user can control the rotation of the pedal and the moving direction by legs.

If the driver is too high, the transversal end of the seat frame can be telescopic for adjusting the length thereof. The driving means of the present invention is not confined to the chain and chain wheel, they may be a belt and a belt wheel, or a rotary wheel and a linkage. Thereby, the present invention can be well utilized. Since the rotation center of the wheel frame is near the body, the moving direction can be controlled by hands or by legs. The present invention can be stored with an unfolded shape and a folded shape. Thus, it is completely different from the prior art. The tricycle of the present invention has a light weight and is portable.

Figure 15:
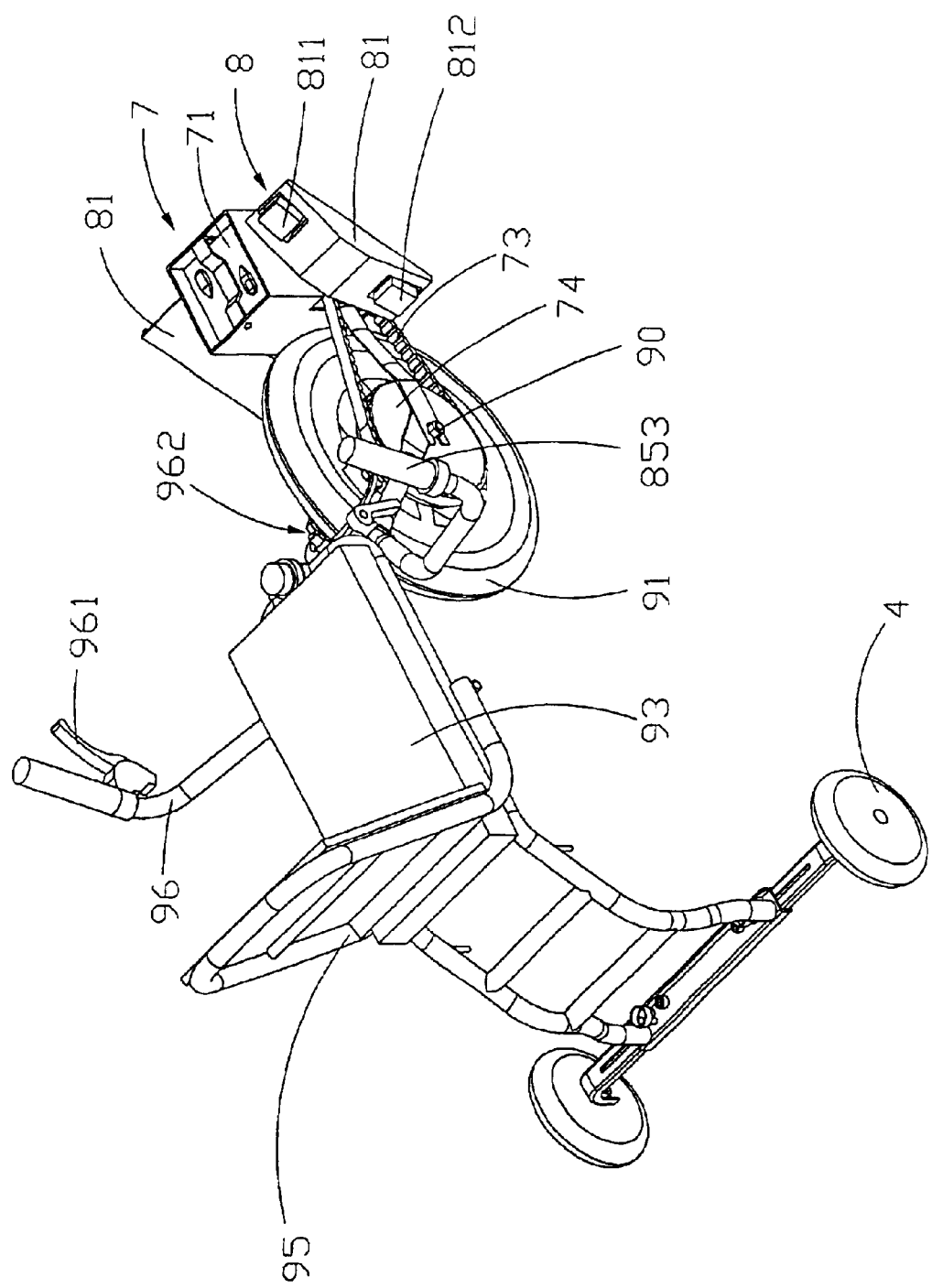
FIG. 15 is a perspective view showing the second embodiment of the present invention.
Figure 16:
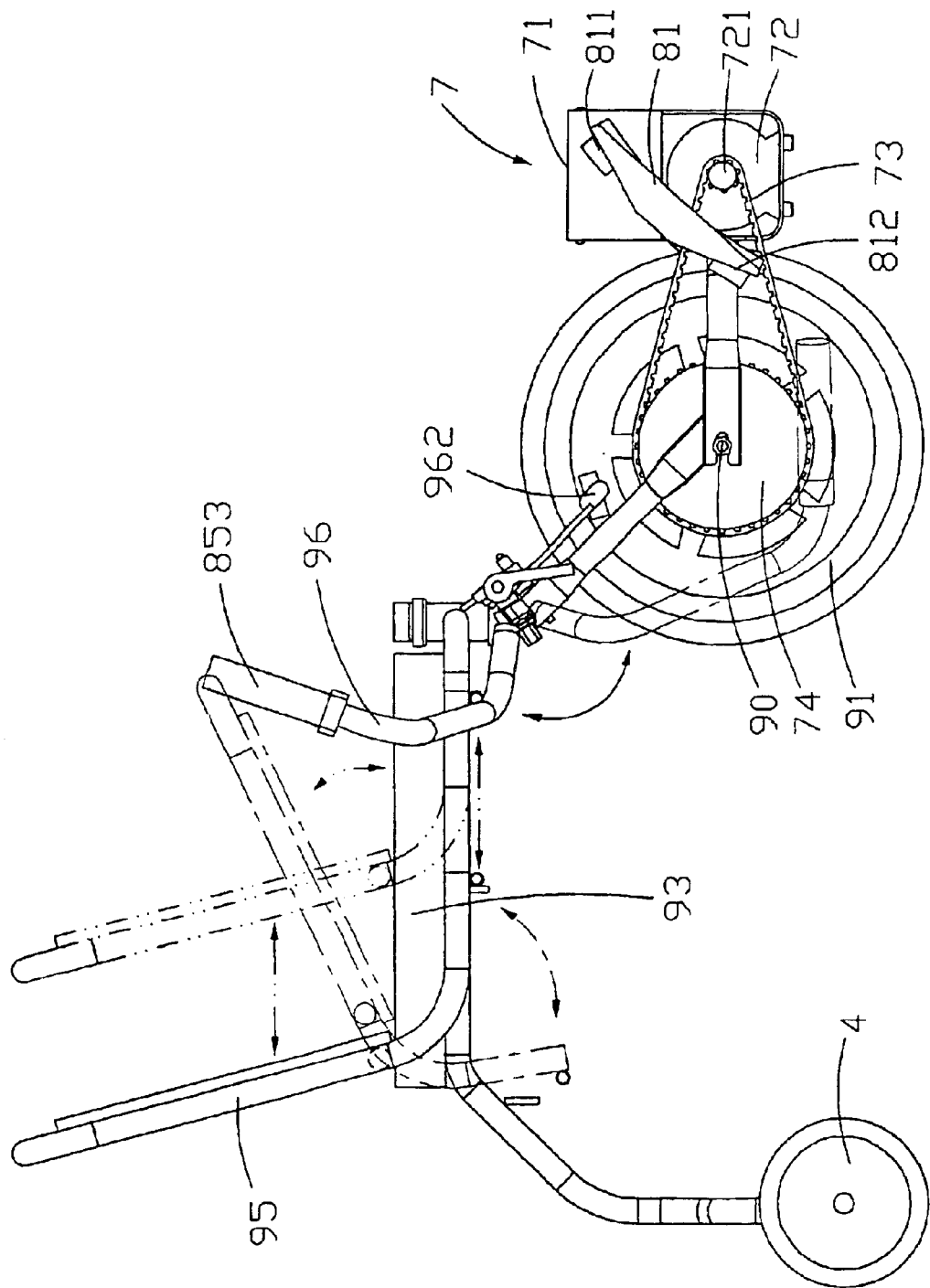
FIG. 16 is a lateral view of the second embodiment of the present invention.
Figure 17:
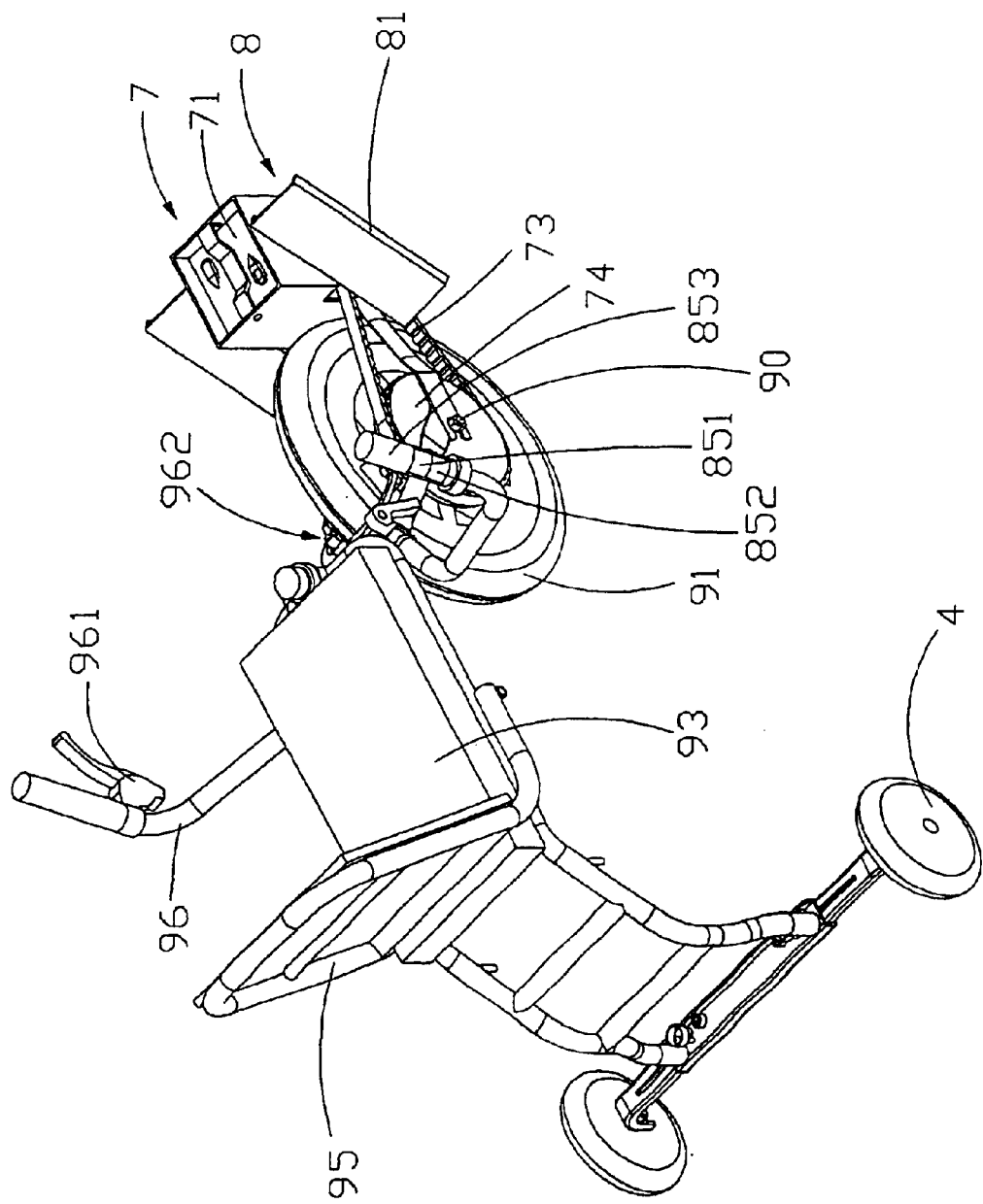
FIG. 17 is a perspective view showing the second embodiment of the present invention, wherein a control means is installed to a handle.

In another embodiment, the driving way can be changed by electric power instead of by human power as described above. With reference to FIGS. 15 to 17, the second embodiment of the present invention is the present invention. This embodiment is modified from the first embodiment, but electric means and control means are added thereto, thereby, the mini-tricycle can be controlled electrically to move forwards, backwards, to accelerate, or decelerate, or brake.

Referring to FIGS. 15 and 16, in the present invention, an electromotive means 7 is used. The electromotive means 7 is formed by a battery 71, a motor 72, a driven element 73 and a driven wheel 74. In this embodiment, the driven wheel 74 is installed at one side of a front wheel 91 so that the driven wheel 74 and the front wheel 91 are engaged with the wheel shaft 90. Since the battery 71 may store electric power for supplying power to the motor 72. The power out shaft 721 of the motor 72 is engaged with the driven element 73 and the driven element 73 is engaged with the driven wheel 74. Thus, when the motor 72 rotates, the power output shaft 721, driven element 73, and the driven wheel 74 can be driven so as to rotate the front wheel 91. Obviously, by the operation of the motor 72, the front wheel 91 can be driven as desired. The position of the electromotive means 7 can be at other position instead of positioning on the front wheel 91 as illustrated in the drawings. Moreover, the position of the battery 71 is not confined. It can be installed below the cushion 93. The embodiments of the power output shaft 721, driven element 73 and driven wheel 74 may be realized by a chain with a chain wheel, or a belt with a belt wheel, etc. The driven element 73 can be neglected. For example, the motor 72 can be directly assembled to the front wheel 91.

To achieve the object of operating the electromotive means 7 as desired, a control means 8 is installed on the mini-tricycle. The control means 8 is assembled to the electromotive means 7 by circuits so as to achieve the object of controlling. The control means 8 is installed at one of pedals 81 at two lateral front sides of the front wheel 91. The control means 8 at the pedal 81 may have a pedal moving forward switch 811 and a pedal moving backward switch or a brake 812. The pedal moving forward switch 811 is used to control the forward movement of the mini-tricycle and the pedal moving backward switch or a brake 812 serves to control the backward movement and braking of the mini-tricycle. The control means 8 can be added with a frequency change switch for controlling the rotary speed of a motor 72.

The control means 8 can be installed to a handle 96. Moreover, the handle 96 can be added with a moving forward switch 851, a moving backward switch 852 or a speed control handle 853. The forward movement switch 851 is used to control the forward movement of the mini-tricycle and the moving backward switch 852 serves to control the backward movement of the mini-tricycle. The speed control switch 853 serves to control the frequency of the motor 72 so as to control the moving speed. In the present invention, the handle 96 can be added with a brake means 961 which is matched with a brake device 962 at the front wheel 91. Thereby, the tricycle can be braked by hands as that in the prior art.

The second embodiment can be modified, for example, a movable back plate 95 can be added to the cushion 93 for placing the back of the driver. The moveable back plate 95 has the function of moving forwards and backwards and closing. The motor 72 can be replaced by an engine.

The advantages will be described herein.

8. The present invention has a new form which is different from the prior art, but the strength and function are remained.

9. The adult and child can drive one tricycle. If the seat frame can be prolonged, then more people can drive the tricycle. Thereby, the product can be standardized. Moreover, in the present invention the handle is moved to the front or lower side of the driver's body so that the knees of an adult will not touch the handles. Thereby, the present invention is a product matching the requirement of ergonomics.

10. The resent invention can be stored as it is folded and a folding form so as to reduce the volume. No leg support is necessary as the tricycle is parked. After parked, it can be folded with a less volume and then it can be carried indoors. This function can not achieve by prior art.

11. The present invention has three wheels, and thus it will not fall down as it is parked. The driver may drive the present invention easily without needing a longer training period. Moreover, the present invention is a safe device.

12. The present invention can be controlled by legs, and thus it is beneficial for maimed persons. The two hands of the driver can leave from the handles without lose of controlling. Moreover, if the handles are used in controlling, then the operation of the present invention is more vivid.

13. The present invention has a compact volume and can be made with a lower cost. Moreover, it has no problem of parking.

14. The present invention can be operated electrically.

If should be noted that in the present invention the number of the rear wheels are changed under the condition of dynamic equilibrium.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A mini-tricycle capable of being controlled by legs for determining the direction of the mini-tricycle comprising a front frame and a rear frame; wherein the front frame has a front wheel fork and a pedal fork; a lower end of the front wheel fork has a front wheel spindle; the front wheel spindle is pivotally connected to a front wheel and a follower; the follower is fixedly connected to a front wheel; a lower end of the front wheel fork is connected to a lower end of the pedal fork; an upper end of the pedal fork is connected with a pedal seat; a pedal shaft is pivotally installed to the pedal seat; the pedal shaft is fixed with a driving means; a driven means serves to connect the driving means and the follower; each of two ends of the pedal shaft is connected to one end of a crank; another end of each crank is pivotally connected to a pedal; and a stand shaft is connected to an upper end of the front wheel fork; and the rear frame has a sleeve which is pivotally connected to the stand shaft; an L shaped seat frame is connected with the sleeve; a top of the seat frame has a cushion; and a lower end of the seat frame is connected with a pair of rear wheels.

2. The mini-tricycle as claimed in claim 1, wherein a handle seat is connected to an upper end of the front wheel fork; and each of two ends of the handle seat is extended with a handle; the handle is foldable; the handle seat is installed at a lower end of the stand shaft; and the handle seat is installed with a brake.

3. The mini-tricycle as claimed in claim 2, wherein the handles are connected to the handle seat through quick detaching means; each of two ends of the handle seat has a slot; one end of each handle is an embedding piece for being embedded into the slot; a spindle of the quick detaching means passes through the handle seat and the handle; one control arm of the quick detaching means is connected to one end of the spindle and another end of the spindle is an enlarged end.

4. The mini-tricycle as claimed in claim 1, wherein a crank positioning seat is connected between the crank and the pedal shaft; the crank positioning seat has an axial hole and a positioning slot; the pedal shaft inserts into the axial hole and then a fixing shaft is used to fix the crank positioning seat and the pedal seat; after the crank inserts into the positioning slot, a rotary shaft penetrates therethough and then fixes the crank and the rotary shaft; an opening is formed on the crank; the crank positioning seat has a penetrating hole out of the positioning slot; a frame body protrudes from the penetrating hole; a crank tenon passes through the frame body, the penetrating hole and the opening positions the crank.

5. The mini-tricycle as claimed in claim 1, wherein the cushion has a lifting handle.

6. The mini-tricycle as claimed in claim 1, wherein the driving means is a driving chain wheel and the follower is a driven wheel; and the driven means is a chain which connects the driving chain wheel and the driven wheel.

7. The mini-tricycle as claimed in claim 1, wherein the front wheel is electrically driven by an electromotive means, the electromotive means is formed by a battery, a motor, a driven element and a driven wheel, the driven wheel is installed at one side of the front wheel so that the driven wheel and the front wheel are engaged with the wheel shaft; the battery supplies power to the motor; a power out shaft of the motor is engaged with the driven element and the driven element is engaged with the driven wheel; thus, when the motor rotates, the power output shaft, driven element, and the driven wheel are driven so as to rotate the front wheel.

8. The mini-tricycle as claimed in claim 7, wherein the motor and the front wheel are coupled directly so that the motor drives the front wheel directly.

9. The mini-tricycle as claimed in claim 7, wherein the driven element is a chain and the driven wheel is a wheel engaged with the chain.

10. The mini-tricycle as claimed in claim 7, wherein a control means is connected with the electromotive means; the control means has a pedal moving forward switch, a pedal moving backward switch, and a brake.

11. The mini-tricycle as claimed in claim 1, wherein a moving forward switch, a moving backward switch and a brake are installed on handles.

12. The mini-tricycle as claimed in claim 1, wherein the number of rear wheels is changeable.

13. The mini-tricycle as claimed in claim 1, wherein the mini-tricycle is driven by an engine.

* * * * *